US008587600B1

(12) United States Patent
Tischler et al.

(10) Patent No.: US 8,587,600 B1
(45) Date of Patent: Nov. 19, 2013

(54) SYSTEM AND METHOD FOR CACHE-BASED COMPRESSED DISPLAY DATA STORAGE

(75) Inventors: Brett A. Tischler, Longmont, CO (US); Kenneth J. Kotlowski, Berthoud, CO (US); Willard S. Briggs, Boulder, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 2329 days.

(21) Appl. No.: 11/119,561

(22) Filed: May 2, 2005

(51) Int. Cl.
*G09G 5/36* (2006.01)
*G06F 13/00* (2006.01)

(52) U.S. Cl.
USPC .......... 345/557; 345/537

(58) Field of Classification Search
USPC .......... 345/555, 557, 530, 537, 538
See application file for complete search history.

(56) References Cited

U.S. PATENT DOCUMENTS 5,835,082 A 11/1998 Perego
5,907,330 A * 5/1999 Simmers .......... 345/542
5,931,951 A * 8/1999 Ando .......... 713/324
6,002,411 A * 12/1999 Dye .......... 345/542
6,359,625 B1 * 3/2002 Perego .......... 345/555
6,647,475 B2 * 11/2003 Naito et al. .......... 711/163
2003/0071746 A1 * 4/2003 Koyanagi .......... 341/60
2004/0001067 A1 * 1/2004 Toksvig et al. .......... 345/531
2004/0025069 A1 * 2/2004 Gary et al. .......... 713/300
2004/0158878 A1 * 8/2004 Ratnakar et al. .......... 725/150
2005/0005073 A1 * 1/2005 Pruvost et al. .......... 711/148

* cited by examiner

*Primary Examiner* — Jacinta M Crawford

(57) ABSTRACT

Systems and methods for cache-based compressed display data storage are provided. One system includes memory operable to store compressed display data, a processor comprising a processing core and a cache, a cache storage module operably coupled to the memory and the processor, wherein the cache storage module is to initiate a storage of at least a portion of the compressed display data in the cache in response to an indication that the processing core is in an inactive mode. One method comprises, in response to an indication that a processor is in an inactive mode, transferring compressed display data from a frame buffer in memory to a cache associated with the processor, obtaining a first compressed display data from the cache, and decompressing the first compressed display data to generate a first uncompressed display data.

23 Claims, 4 Drawing Sheets

SYSTEM AND METHOD FOR CACHE-BASED COMPRESSED DISPLAY DATA STORAGE

FIELD OF THE DISCLOSURE

The present disclosure is directed to the processing of display data and more particularly to techniques for display data storage prior to processing.

BACKGROUND

In many display systems, display data is stored in a frame buffer implemented in system memory (such as, for example, dynamic random access memory or DRAM) prior to being accessed by a display controller. The display controller, in turn, formats and otherwise processes the display data for output so as to refresh the displayed image at a display device. Typically, the display data is transferred in units corresponding to one or more display lines (or raster lines) of the display device. This transfer of display data between the frame buffer in memory and the display controller consumes a considerable portion of the bandwidth of the bus between the memory and the display controller. To illustrate, for a display having a resolution of 1600×1200 pixels at 16 bits per pixel and a refresh rate of 70 Hertz, the corresponding necessary bandwidth of the memory-to-display controller bus, disregarding any overhead, is approximately 270 megabytes (MB) per second. Such a bandwidth requirement can tax many such memory buses. It will be appreciated that this bandwidth requirement is further exacerbated at higher resolutions, higher refresh rates, and higher bit-per-pixel representations.

In view of the problems associated with excessive bandwidth consumption during the transfer of display data to a display controller, a technique has been developed to reduce the amount of data transferred. This technique employs a data compression scheme whereby display data may be compressed on a display line-by-display line basis. The first time the display data for a display line is obtained from the frame buffer, the display controller compresses the display data in addition to providing the display data to the display device. The display data then is stored in a second frame buffer for compressed display data. Thus, the next time the same display line is to be displayed at the display device (i.e., when there is no change to the corresponding line of the displayed image), the compressed display data corresponding to the display line may be transferred to the display controller from the second frame buffer, whereupon the display controller may decompress the display data and otherwise process it for output to a display device. As a result, the overall data transferred to the display controller, and therefore the overall bandwidth consumed, may be reduced as some or all of the display data may be compressed as it is transferred. Exemplary techniques for compressing the display data are disclosed in, for example, U.S. Pat. Nos. 5,834,082 and 6,359,625, the entireties of which are incorporated by reference herein.

While the above-described conventional technique provides a reduction in the overall bandwidth required to transfer display data from memory to the display controller, this technique fails to address the power consumption resulting from the operation of the memory implementing the frame buffer and its display data, as well as the power consumption resulting from the transfer of the display data, even in its compressed form, over the bus or buses connecting the memory to the display controller. Accordingly, an improved technique for storing display data prior to the processing of the display data for output to a display device would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DRAWINGS

The following description is intended to convey a thorough understanding of the present disclosure by providing a number of specific embodiments and details involving display data processing and storage. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

FIGS. 1-4 illustrate exemplary systems and techniques for storing, accessing and processing display data so as to reduce the necessary transfer bandwidth and the power consumption typically associated with such operations. In at least one embodiment, some or all of the compressed display data of a frame buffer implemented in memory is transferred to cache when, for example, a processor is in an inactive mode where few if any changes typically are made to the displayed image. Accordingly, a display controller may access compressed display data from the cache rather than the frame buffer in memory during this time, thereby reducing the bandwidth consumed by the memory bus. Moreover, because the processor is in an inactive mode during this time and because the display data being used to refresh the display device is obtained from the cache during this time, the memory may be disabled, thereby reducing the power consumption of the system. When the processor enters an active mode, or when a write to the cache occurs, the memory may be enabled and the display controller may revert back to obtaining display data from the compressed frame buffer and/or uncompressed frame buffer implemented in the memory.

Although the exemplary systems and techniques illustrated herein are discussed in the context of storing compressed data in the cache, in instances wherein the cache is capable of storing a sufficient amount of the uncompressed display data to support refreshing of the display image, the systems and techniques described below may be implemented to store and subsequently access uncompressed display data rather than compressed display data without departing from the spirit or the scope of the present disclosure.

Display data, as referred to herein, comprises the data directly representative of a display image on a pixel-by-pixel basis. Display data is also often referred to as pixel data. In at least one embodiment, the display data subject to the exemplary compression and storage techniques described herein includes display data exclusive of overlay data as overlaid components, such as a mouse cursor, changes appearance and location frequently, and therefore would increase the overhead in compression if included in the display data.

Figure 1:
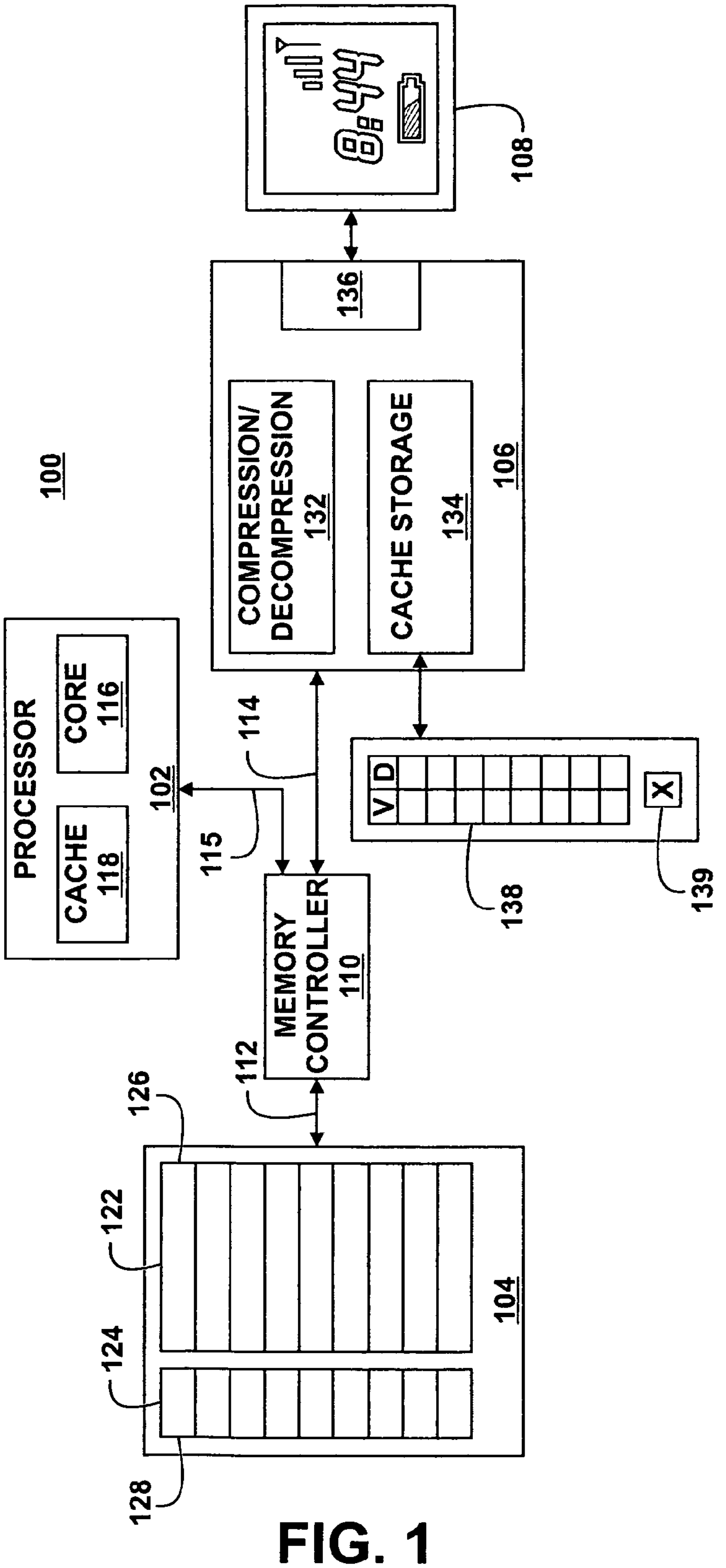
FIG. 1 is a block diagram illustrating a system for displaying images on a display device in accordance with at least one embodiment of the present disclosure.

Referring now to FIG. 1, an exemplary system 100 for storing, accessing and otherwise processing data representative of one or more display images is illustrated in accordance with at least one embodiment of the present disclosure. In the depicted example, the system 100 includes a processor 102, a memory 104, a display controller 106 and a display device 108. The memory 104 is coupled to a memory controller 110 via a bus 112, the memory controller 110 is coupled to the processor 102 via a bus 115, and the display controller 106 and the memory controller 110 are coupled together via a bus 114. Note that the buses 112, 114 and 115 may be the same or different buses depending on the particular implementation.

The processor 102 includes a processor core 116 (representing, for example, an instruction pipeline) and at least one cache 118. The cache 118 may include, but is not limited to, a level 1 (L1) cache, a level 2 (L2) cache, and the like. In at least one embodiment, the cache 118 is implemented "on-chip" with the processor core 102. The cache 118 may implement any of a variety of cache structures, such as, for example, a single-way cache, a multi-dimensional set-associative cache, and the like. Moreover, the cache 118 may include other types of on-chip memory components frequently implemented by processors such as, for example, an on-chip static random access memory (SRAM). Accordingly, unless otherwise noted herein, the term cache refers to both conventional cache structures, such as an L2 cache, or to other processor-based memory structures, such as an on-chip SRAM, as well as caches with lock down capabilities, such as a cache having a scratchpad mode.

The memory 104, in at least one embodiment, implements one or more frame buffer portions 122 and 124 to store display data representative of one or more display images. As described in greater detail below, the frame buffer portion 122 stores uncompressed display data and the frame buffer portion 124 stores compressed display data corresponding to the display data of the frame buffer portion 122. For ease of illustration, it is assumed that each row of the frame buffer portion 122 stores the display data associated with a corresponding line of the display image (i.e., a corresponding display line or raster line of the display device 108) and that each of at least a subset of the rows of the frame buffer portion 124 stores a compressed version of the display data of the corresponding row of the frame buffer portion 122. To illustrate, assuming row 126 of frame buffer portion 122 is associated with the first line of an image to be displayed on the display device 108, the compressed display data in row 126 is representative of the pixel characteristics of the first line of the image and the display data in corresponding row 128 of the frame buffer portion 124 is a compressed version of the display data in row 126. However, while these assumptions are made for ease of discussion, those skilled in the art may implement, using the guidelines provided herein, other display data storage arrangements in the buffer frame portions 124 and 126 without departing from the spirit or the scope of the present disclosure.

It will be appreciated that although memories, such as memory 104, typically are implemented to have storage widths that are a power of two, many display devices have resolutions that are not powers of two. For example, a display resolution of 640×480 (e.g., a VGA resolution) at 8 bits per pixel would require a memory having 480 rows, each row having 640 bytes to represent a display image in the frame buffer. However, the smallest memory having a width capable of storing the display data for such an image would have a row width of 1024 bytes (e.g., $2^{10}$ bytes), resulting in 384 unused bytes per row (assuming no overhead). Accordingly, in at least one embodiment, the frame buffer portions 122 and 124 are implemented in the same portion of the memory 104, where each row of the frame buffer portion 122 and the corresponding row of the frame buffer portion 124 occupy the same row of the memory 104. To illustrate using the above example, the rows of the buffer portion 122 may occupy, for example, the first 640 bytes of the memory rows while the rows of the buffer portion 124 occupy, for example, the remaining 384 bytes of the memory rows. Alternatively, the frame buffer portions 122 and 124 may be implemented in separate segments of the same memory, or they may be implemented in separate memories.

The display controller 106, in one embodiment, includes a compression/decompression module 132, a cache storage module 134 and a formatting module 136. The modules 132-136 may be implemented in software, firmware, hardware, or a combination thereof. The formatting module 136 provides the processing and formatting operations used to provide a representation of received display data for output to the display device 108, where the display device 108, in turn, converts the representation of the formatted display data into at least part of a displayed image. The formatting operations provided by the formatting module 136 may include, for example, color palette look-up, insertion of overlays, digital-to-analog conversion, LCD or CRT formatting, and the like.

The display controller 106 obtains display data and processes display data for output to the display device 108. As discussed in greater detail herein, the display controller 106 may selectively obtain the display data from the frame buffer portion 122, the frame buffer portion 124 or from the cache 118 depending on one or more factors, including the mode or state of the processor 102 or the presence or absence of updates or other changes to the image to be displayed.

In some instances, the frame buffer portions 122 and 124 of the memory 104 serve as the source of display data. The display controller 106 first looks to see if compressed display data for the display line to be processed is present in the corresponding row of the frame buffer portion 124. If present and marked as valid (as may be determined from, for example, a dirty/valid tag array 138), the compressed display data may be obtained from the row of the frame buffer portion 124, decompressed by the compression/decompression module 132 and the resulting uncompressed display data may be formatted for display by the formatting module 136. If no valid compressed display data is present in the appropriate row of the frame buffer portion 124, the display controller 106 instead may access the uncompressed display data for the display lines from the corresponding row of the frame buffer portion 122. The uncompressed display data then may be processed for output to the display device 108 by the format module 136.

Additionally, in at least one embodiment, the compression/decompression module 132 generates a compressed version of the display data and provide the resulting compressed display data for storage in the appropriate row of the frame buffer portion 124. Exemplary compression techniques used to compress the display data may include lossless compression techniques, such as run-length encoding, or lossy techniques, such as dithering, truncation of bits, or the like. While lossless compression techniques ensure that no data content is lost in the compression/decompression cycle, it will be appreciated that lossy compression techniques typically ensure that the resulting compressed data is within a certain data size and therefore able to fit in the cache 118.

The next time the display device 108 is refreshed, the display controller 106 may obtain the compressed version of the display data from the frame buffer portion 124 rather than obtaining the larger uncompressed version from the frame buffer portion 122. By selecting the compressed display data from the frame buffer portion 124 (when available and valid) over the uncompressed display data from the frame buffer portion 122, the display controller 106 may reduce the total amount of data transferred over the buses 112 and 114, thereby freeing additional memory and bus bandwidth for other applications.

As described below with reference to FIGS. 2-4, some or all of the compressed display data of the frame buffer portion 124 may be transferred to the cache 118 and the memory 104 may be placed in a low power mode (e.g., by clock-gating the memory). The compressed display data may be transferred by providing a copy of the compressed display data for storage in the cache 118 while retaining the compressed display data in the frame buffer portion 124 or the rows of the frame buffer portion 124 may be invalidated (e.g., by deasserting the invalid bit fields in the dirty/valid tag array 138) or cleared. Thus, in other instances, the cache 118 serves as the source of display data for the display controller 106, whereby the display controller 106 obtains compressed display data stored in the appropriate cache row and the compression/decompression module 132 decompresses the compressed display data for processing and output by the formatting module 136. A representation of the display data then is transmitted to the display device 108 for display.

In at least one embodiment, the system 100 maintains a global dirty bit tag 139 so as to indicate whether any write accesses to the cache 118 have occurred after the compressed display data has been transferred to the cache 118. Thus, the global dirty bit tag 139 indicates whether the compressed display data in the cache 118 may have been modified and therefore whether the cache 118 is suitable as the source of display data when refreshing the display device 108. Thus, in response to an assertion of the global dirty bit tag 139 (thereby indicating that the validity of the compressed display device in the cache 118 is questionable), the display controller 106 may elect to return to using the frame buffer portions 122 and 124 as the source of display data. This switch may occur immediately or after one or more additional refresh cycles.

It will be appreciated that accessing the on-chip cache 118 typically requires less power than driving the buffers and the printed circuit board (PCB) connections to a separate memory. Thus, by transferring the compressed display data for a portion or all of one or more images to the cache 118, subsequently disabling the memory 104, and using the cache 118 as the source of display data under certain circumstances, the overall power consumption of the system 100 may be reduced as less power is consumed by the memory while in a low power or disabled state. This power consumption is particularly important in portable devices or battery-operated devices that may implement the system 100, such as, for example, cellular phones, digital cameras, portable audio devices, portable video devices, notebook computers, and the like.

In one embodiment, the transfer of compressed display data to cache 118 and the disabling of the memory 104 occurs when the processor 102 enters, or is about to enter, an inactive mode (i.e., a mode where the processor is entirely inactive or has a reduced activity) whereby the processor 102 does not, or is unlikely to, make changes or updates to the image displayed by the display device 108. Consequently, the processor 102 does not, or is unlikely to, make changes to the display data representative of the unchanged image. Thus, at the time the processor 102 enters the inactive mode, the compressed display data of the frame buffer portion 124 typically is representative of the image displayed by the display device for the duration of the time the processor 102 is in the inactive mode. Accordingly, by transferring the compressed display data of the frame buffer portion 124 to the cache 118 during the inactive mode of the processor 102, the cache 118 may provide compressed display data to the display controller 106 for display as a display image without significantly impacting the displayed image as there are likely to be no or few changes.

As an example, the displays of cellular phones often are only updated once a minute to reflect the change in the minutes of time displayed on the cellular phone when the cellular phone is not in use. Thus, the displayed image is static for the near minute between updates. Such cellular phones may implement the system 102 whereby the compressed version of the display data representative of the static displayed image is stored in and accessed from the cache of the cellular phone processor for the time between updates. This allows the memory of the cellular phone that implements the frame buffer(s) to be disabled, thereby reducing the power consumption of the cellular phone during the one-minute inactivity periods. This power savings translates to a longer battery life for the cellular phone.

Figure 2:
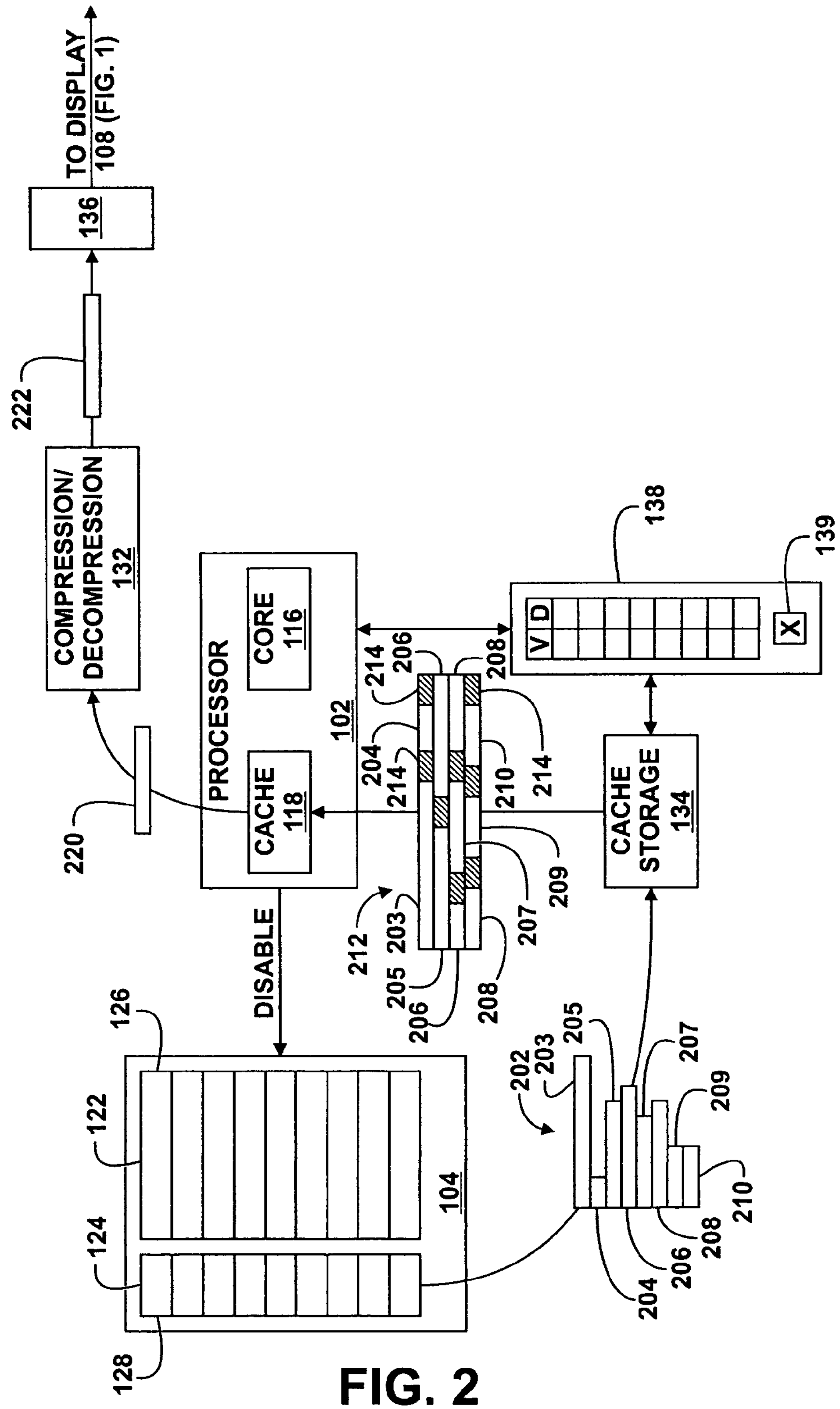
FIG. 2 is a block diagram illustrating an exemplary operation of the system of FIG. 1 in accordance with at least one embodiment of the present disclosure.
Figure 3:
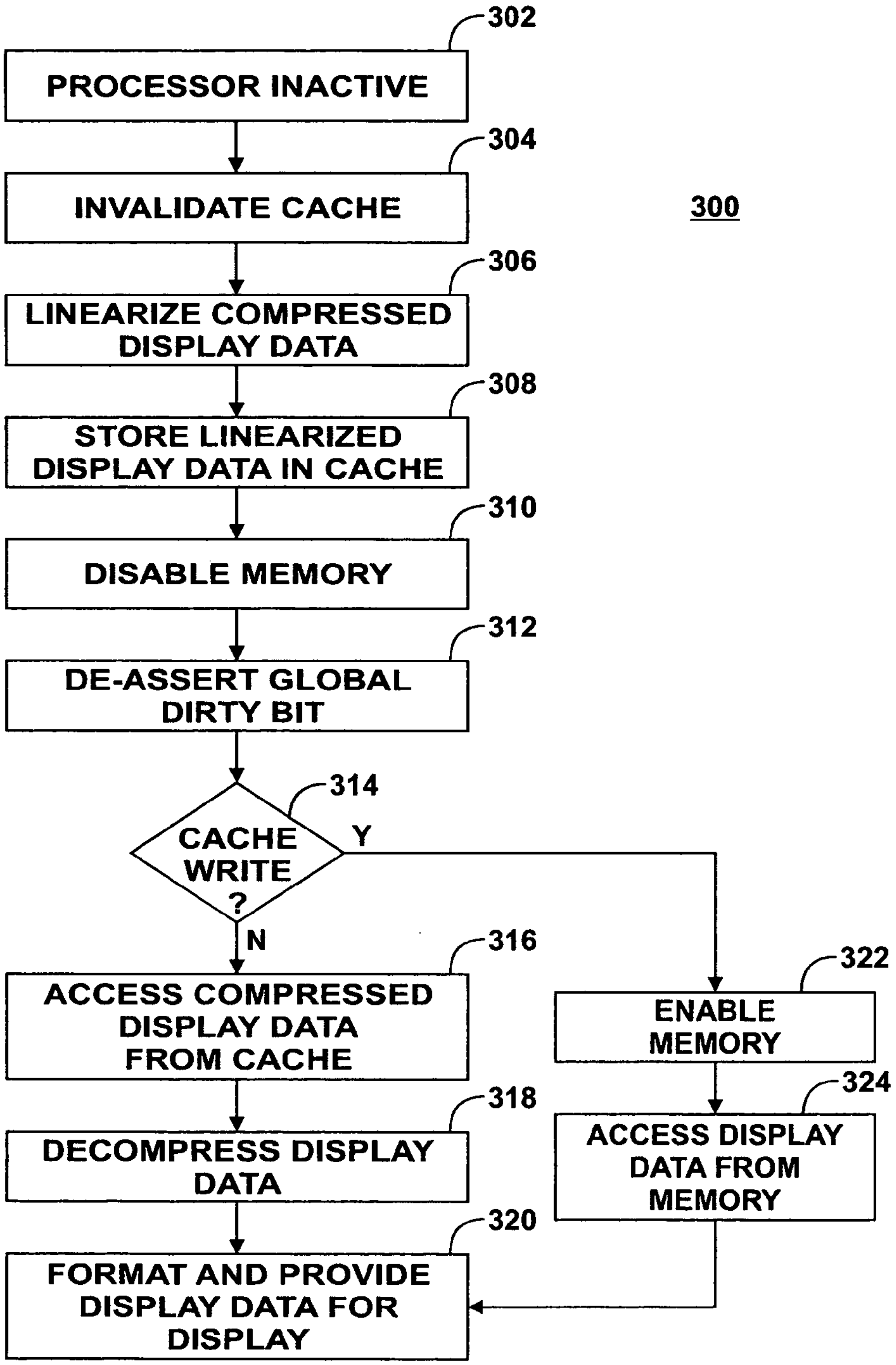
FIGS. 3 and 4 are flow diagrams illustrating exemplary methods for storing and accessing display data in accordance with at least one embodiment of the present disclosure.
Figure 4:
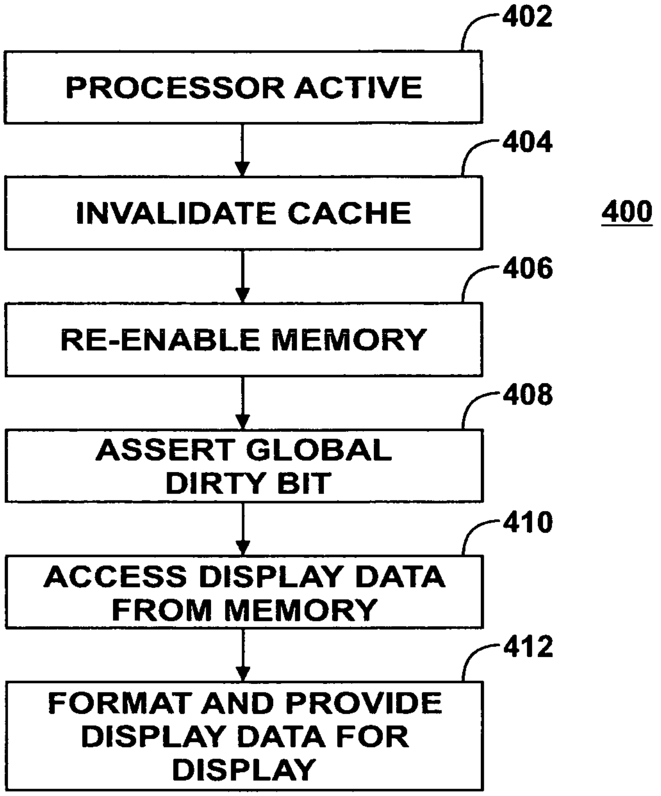

Referring now to FIGS. 2-4, exemplary operations of the system 100 are illustrated in accordance with at least one embodiment of the present disclosure. As described above, the display controller 106 (FIG. 1) may compress some or all of the rows of uncompressed display data in the frame buffer portion 122 and store the resulting compressed display data in the corresponding rows of the frame buffer portion 124 during display operations. During one mode, such as when the processor 102 is in an active mode, the display controller 106 may obtain compressed display data from the frame buffer portion 124, if available and valid for the given display line, decompress the compressed display data and then format the decompressed display data for output to the display device 108 (FIG. 1). This use of compressed display data, when available, reduces the overall amount of data transferred from the memory 104.

However, in another mode, such as when the processor 102 is in an inactive mode, the some or all of the contents of the frame buffer portion 124 may be transferred to the cache 118 and the memory 104 thereafter may be disabled. The display controller 106 then may obtain compressed display data from the cache 118 for processing rather than from the memory 104. The memory 104, being disabled, consumes less power while the display controller 106 operates in this alternate mode.

FIG. 3, in conjunction with FIG. 2, illustrates an exemplary operation 300 of the system 100 as the processor 102 enters or prepares to enter an inactive mode whereby relatively few or no changes are likely to occur to the image displayed on the display device 108. At step 302, the processor 102 provides an indication that the processor 102 is about to enter, or has entered, an inactive mode. In one embodiment, the indication is provided as, for example, a command signal to the display controller 106, which then handles the transfer of compressed display data to the cache 118. In another embodiment, the indication may be provided to the memory controller 110, which in turn manages the transfer of the compressed display data to cache 118. Alternatively, the processor 102 itself may manage the transfer of the compressed display data to cache 118. This indication also may serve to cause the display controller 106 to switch from the memory 104 to the cache

118 as the source of display data. At step 304, the cache 118 is invalidated. Invalidation of the cache 118 may include, for example, overwriting the cache 118 or clearing the valid tag fields of a valid tag array associated with the cache 118.

As noted above, the rows of the frame buffer portions 122 and 124 often correspond to rows of the memory 104. To illustrate using a previous example, assuming the resolution of the display device 118 is 640×480 pixels, each pixel has a depth of eight bytes and memory 104 has a row width of 1024 bytes, the rows of the frame buffer portion 122 may have a width of, for example, 640 bytes and the rows of the frame buffer portion 124 occupy the remaining 384 bytes (assuming no overhead). It will be appreciated that although the uncompressed display data representing each of the lines typically is constant as each pixel of the corresponding display line is represented in the uncompressed display data, the corresponding compressed display data for the display lines may be highly variant due to the compressibility of the data of each display line. To illustrate, areas of a display image that represent text typically may be compressed into a much smaller amount of data using run-length encoding or similar techniques than areas of a display image that represent, for example, a full-color picture. Thus, the amount of compressed display data stored in the rows of the frame buffer portion 124 typically is variant from row-to-row in implementations that utilize a separate row of a frame buffer for the compressed display data of each display line.

Thus, one solution to transferring the compressed display data from the frame buffer portion 124 to the cache 118 is to transfer the compressed display data for each row of the frame buffer portion 124 to a corresponding row of the cache 118. However, the cache 118 may not have storage dimensions compatible with the frame buffer portion 124. To illustrate, the cache 118 may not have a row width as large as the frame buffer portion 124 or the cache 118 may not have as many rows as there are display lines. Accordingly, the cache 118 may be unable to store all of the compressed display data if such a row-to-row transfer of the compressed display data is used. Accordingly, at step 308, the compressed display data to be transferred (represented as compressed display data 202 in FIG. 2) is linearized so as to more appropriately fit in the cache 118. To linearize the compressed display data 202, the cache storage 134 (or another component of the system 100) may write the rows of the display data 202 to the rows of the cache 118 in a contiguous manner whereby the compressed display data from a row of the frame buffer portion 124 may span over two or more rows of the cache 118. To illustrate, assume that the display data 202 is represented by compressed display data rows 203-210. In an exemplary linearization of the display data 202 depicted as linearized display data 212 in FIG. 2, the display data rows 203 and 204 span a first row of the cache 118; the display data row 205 spans a portion of the second row of the cache 118; the display data row 206 spans the remaining portion of the second row of the cache 118 and a portion of the third row of the cache 118; the display row 207 spans a portion of the third row of the cache 118; the display row 208 spans the remaining portion of the third row of the cache 118 and a portion of the fourth row of the cache 118; and the display rows 209 and 210 span the remaining portion of the fourth row of the cache 118.

At step 308, the linearized display data 212 is stored in the cache 118. The linearized display data 212 may be formed in a buffer and then transferred to the cache 118 or it may be formed directly in the cache 118. Alternately, in instances where the cache 118 is compatible with a row-to-row transfer of the compressed display data 202, the compressed display data 202 may be thus transferred. Further, as illustrated in FIG. 2, the linearization of the compressed display data 202 may include the implementation of an end sequence 214 to indicate the end of the compressed display data for one display line and the beginning of the compressed display data for the next display line.

It will be appreciated that compressed display data for certain display lines may not be present in the frame buffer portion 124 as the uncompressed display data for these certain display lines has not yet been compressed by the compression/decompression module 132. Accordingly, in at least one embodiment, uncompressed display data from the rows of the frame buffer 122 that correspond to the rows of the frame buffer 124 absent of valid compressed display data is compressed using the compression/decompression module 132 and the compressed display data may be stored in the frame buffer 124 prior to the compressed data transfer or it may be stored directly to the cache 118 as part of the transfer process. Alternatively, if the cache 118 is capable of storing the uncompressed display data for a display line, the uncompressed display line may be written to the corresponding row(s) of the cache 118.

After transferring the compressed display data from the frame buffer portion 122 to the cache 118, the memory 104 may be disabled or placed in a low-power mode at step 310. The memory 104 may be disabled by, for example, clock gating or otherwise shutting off the clock provided to the memory 104 and the drivers for one or more of the buses 112, 114 or 115 (FIG. 1). Alternatively, the power supplied to the memory 104 may be shut off while the memory 104 is disabled.

At step 312, the global dirty bit tag 139 is deasserted to indicate that the compressed display data stored in the cache 118 is valid at that point in time. Depending on whether or not a cache write has occurred (step 314)(and the global dirty bit tag 139 asserted in response), the display controller 106 may select between using the cache 118 or the frame buffer portions 122 and/or 124 as the source of display data for the purpose of refreshing the displayed image. In the event that no cache writes have occurred (and the global dirty bit tag 139 therefore remains unasserted), the display controller 106 may access compressed display data from the cache 118 for decompression and formatting for output to the display device 108 (FIG. 1). To illustrate, in preparation for refreshing a display line, the display controller 106 may obtain the compressed display data 220 associated with the display line from the cache 118 at step 316. As noted above, the compressed display data stored in the cache 118 may implement end sequences 214, thereby allowing the display controller to progress sequentially through the cache 118 to obtain the compressed display data for the next display line to be refreshed.

At step 318, the compressed display data 220 is provided to the compression/decompression module 132 whereupon it is decompressed to generate uncompressed display data 222. The uncompressed display data 222 then is processed by the formatting module 136 at step 320 and provided for output to the display device 108 so as to refresh the display line.

In contrast, if it is determined from the global dirty bit tag 139 that a cache write has occurred or if it is determined that the processor 102 is no longer in an inactive mode, the memory 104 is enabled at step 322 and the display data for one or more display lines to be refreshed is obtained from the frame buffers 122 and 124 in memory 104 at step 324. The display data from the frame buffers 122 or 124 then may be processed and provided for display at step 320.

FIG. 4, in conjunction with FIG. 2, illustrates an exemplary operation 400 of the system 100 after the processor 102 exits, or prepares to exit, an inactive mode. At step 402, the processor 102 provides an indication that it has entered or is in the process of entering an active mode. This indication may include, for example, a control signal sent to the display controller 106 (FIG. 1) to direct the display controller 106 to resume processing display data from the memory 104. At step 404, the cache 118 is invalidated by, for example, overwriting the cache 118 or clearing the valid tag fields of the dirty/valid tag array 138. At step 406, the memory 104 is enabled and the global dirty tag field 139 is asserted at step 408, thereby indicating that the display data in the cache 118 is invalid.

At step 410 the display controller 106, in response to the indication that the processor 102 is in an active mode and/or in response to the asserted global dirty tag 139, switches to obtaining display data from the frame buffer portions 122 and 124 in memory 104 rather than the cache 118. At step 412, the display data obtained from the frame buffer portions 122 and 124 is decompressed, if necessary, formatted and output for display to the display device 108 (FIG. 1).

The above-disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system comprising:

memory operable to store compressed display data;

a processor comprising a processing core and a cache; and a cache storage module operably coupled to the memory and the processor, the cache storage module to initiate a storage of at least a portion of the compressed display data in the cache in response to an indication that the processing core is in, or preparing to enter, an inactive mode.

2. The system of claim 1, further comprising:

means for disabling the memory in response to the indication.

3. The system of claim 2, further comprising:

means for enabling the memory in response to an indication that the processing core is in, or about to enter, an active mode.

4. The system of claim 2, further comprising:

a display controller operably coupled to the memory and the cache of the processor, the display controller to:

in a first mode:

receive a first compressed display data from the cache;

decompress the first compressed display data to generate a first uncompressed display data; and provide a representation of the first uncompressed display data for display on at least one display device.

5. The system of claim 4, wherein the display controller is further to:

in a second mode:

receive a second compressed display data from the memory;

decompress the second compressed display data to generate a second uncompressed display data; and provide a representation of the second uncompressed display data for display on the at least one display device.

6. The system of claim 5, wherein the first mode corresponds to the inactive mode of the processor and the second mode corresponds to an active mode of the processor.

7. The system of claim 4, further comprising a validity field indicating whether a write has occurred to the cache subsequent to storing the at least a portion of the compressed display data in the cache.

8. The system of claim 7, wherein the display controller selectively receives and processes compressed display data from the memory or the cache in response to a value of the validity field.

9. The system of claim 2, wherein the cache storage module is further to linearize the at least a portion of the compressed display data prior to the storage of the at least a portion of the compressed display data.

10. A display controller comprising:

a first input operably coupled to a cache of a processor;

a second input operably coupled to a memory;

an output operably coupled to a display device;

a decompression module operably coupled to the first and second inputs and the output, the decompression module operable to:

in response to an indication that the processor is in an inactive mode:

receive a first compressed display data from the cache;

decompress the first compressed display data to generate a first uncompressed display data;

in response to an indication that the processor is in an active mode:

receive a second compressed display data from the memory; and decompress the second compressed display data to generate a second uncompressed display data; and a cache storage module operable to initiate a transfer of compressed display data in the memory to the cache in response to the indication that the processor is in an inactive mode.

11. The display controller of claim 10, further comprising:

a format module operably coupled to the output, the format module operable to:

provide a representation of the first compressed display data for display by the display device in response to the indication that the processor is in an inactive mode; and provide a representation of the second compressed display data for display by the display device in response to the indication that the processor is in an active mode.

12. The display controller of claim 10, wherein the cache storage module further is operable to linearize the compressed display data prior to its transfer from the memory to the cache.

13. A method comprising:

in response to an indication that a processor is in, or preparing to enter, an inactive mode:

transferring compressed display data from a frame buffer in memory to a cache associated with the processor;

obtaining a first compressed display data from the cache; and decompressing the first compressed display data to generate a first uncompressed display data.

14. The method of claim 13, further comprising:

disabling the memory in response to the indication.

15. The method of claim 13, further comprising:

providing a representation of the first uncompressed display data for display on a display device.

16. The method of claim 13, further comprising:

in response to an indication that the processor is in, or preparing to enter, an active mode:

obtaining a second compressed display data from the frame buffer in memory;

decompressing the second compressed display data to generate a second uncompressed display data.

17. The method of claim 16, further comprising:

enabling the memory in response to the indication that the processor is in, or preparing to enter, the active mode.

18. The method of claim 13, wherein transferring the compressed display data from the frame buffer to the cache includes linearizing the compressed display data.

19. A method comprising:

transferring compressed display data from a frame buffer in memory to a cache associated with a processor in response to an indication that the processor is in, or preparing to enter, an inactive mode; and selectively obtaining compressed display data for display from either the frame buffer in memory or the cache in response to a value of a global dirty bit field while the processor is in an inactive mode.

20. The method of claim 19, further comprising:

clearing the global dirty bit field associated with the cache in response to the transfer of the compressed display data; and asserting the global dirty bit field in response to a write to the cache.

21. The method of claim 19, wherein transferring the compressed display data comprises linearizing the compressed display data.

22. The method of claim 19, further comprising:

decompressing the selectively obtained compressed display data to generate uncompressed display data; and providing a representation of the uncompressed display data for display on a display device.

23. The method of claim 19, further comprising:

selectively enabling or disabling the memory in response to a value of the global dirty bit field while the processor is in an inactive mode.

* * * * *